Patented Oct. 10, 1950

2,525,155

UNITED STATES PATENT OFFICE 2,525,155

COMPOSITIONS FOR INHIBITING FOULING

Arthur William Frank Thynne, London, England, and Donald Helmsley Hewitt, deceased, late of London, England, by Ernest Booth, Richmond, and Richard H. Buckle, Barnt Green, England, executors, assignors, by mesne assignments, to The Sherwin-Williams Company, Cleveland, Ohio, a corporation of Ohio No Drawing. Application February 26, 1948, Serial No. 11,346. In Great Britain September 2, 1946

Section 1, Public Law 690, August 8, 1946
Patent expires September 2, 1966

6 Claims. (Cl. 106—16)

This invention is for improvements in or relating to compositions for inhibiting incrustation and fouling of ships' hulls and other submerged surfaces.

In order to inhibit the growth of marine organisms and flora below the water line of ships, it is necessary to paint the metal or wood surface with a composition containing a substance toxic to fouling organisms. For this purpose, it is usual to employ compounds of copper, mercury or arsenic in a suitable paint medium. Inorganic compounds of mercury are excellent anti-fouling agents but their power is rapidly reduced in the presence of organic matter. For example, in the presence of serum, mercuric chloride is about 90% less efficient than in water. Furthermore, such salts of mercury are highly reactive with metal surfaces.

We have now found that certain organic salts of mercury are superior anti-fouling agents to the inorganic compounds of mercury and, moreover, are less liable to cause corrosion of metal surfaces with which the anti-fouling composition comes in contact.

According to the present invention, therefore, there is provided an anti-fouling composition comprising a n-propyl or n-butyl mercuric salt dispersed in a plasticised natural or synthetic thermoplastic resin composition containing no substantial quantity of combined oil and capable of setting, independently of oxidation, to a film, tack-free at ordinary temperatures, the amount of said organic mercury salt being from 1% to 30% by weight of the final film.

The thermo-plastic natural or synthetic resin utilised in the formation of the anti-fouling composition should be of a grade such as is normally used in varnish manufacture, particularly varnish media used in marine paints and the following are examples of typical natural and synthetic resins which can be used in the present invention:

Resin and polyhydric alcoholic esters thereof such as ester gum and the like.

Copal resins which have been pyrolysed until they are soluble in aliphatic hydrocarbon solvents such as mineral spirits.

Hydrocarbon polymers of coal tar origin such as coumarone and indene polymers soluble in aromatic hydrocarbons.

Hydrocarbon polymers of petroleum origin.
Polystyrene.
Coal tar pitch.
Chlorinated rubber.

The plasticisers which can be used in the formulation of the plasticised resin composition can be any plasticiser which is compatible with the particular resin; the following materials are examples of plasticisers suitable for use in the invention:

Drying oils, whether raw, refined, heat-treated or oxidised,
Coal tar,
Liquid esters of rosin and modified rosins, Metallic soaps of saturated and unsaturated fatty or petroleum acids such as the cobalt, manganese and zinc soaps of stearic, linoleic and naphthenic acids.

Chlorinated paraffins, naphthalenes or other chlorinated polynuclear hydrocarbons.
Lanolin.
Natural and synthetic waxes such as Montan wax.

A feature of the invention consists in that the n-propyl or n-butyl mercuric chloride is employed as said mercuric salt.

It will be appreciated that the anti-fouling composition may contain pigments or extenders or other ingredients such as are commonly used in surface-coating compositions.

The anti-fouling compositions of the present invention may be utilised in their solventless state by spraying the composition whilst hot through any suitable spraying apparatus on to the surface to be protected against the formation of marine incrustations.

The invention, however, is not to be regarded as limited to solventless compositions and a feature of the invention cosists in that said anti-fouling composition comprises a volatile solvent for said resin composition; such solvent-containing compositions may be applied by brush or, if desired, they may also be applied by spraying.

In certain instances, aluminium or aluminium alloys have been utilised for ships' hulls and we have found that the anti-fouling composition of the present invention can very satisfactorily be used on a primed aluminium or aluminium alloy surface; the corrosive activity of inorganic mercury compounds is such that it is not possible to apply them satisfactorily to aluminium or aluminium alloy surfaces even though such surfaces may be coated or sealed with a priming coat.

A convenient method of preparing the antifouling compositions of the present invention consists in grinding the organic mercuric salt into the natural or synthetic resin composition and accordingly the invention also comprises a method of preparing an anti-fouling composition comprising grinding a n-propyl or n-butyl mercuric salt into a plasticised natural or synthetic thermoplastic resin composition containing no substantial quantity of combined oil and capable of setting, independently of oxidation, to a film, tack-free at ordinary temperatures in an amount of from 1% to 30% by weight of the final film; the mixture of organic mercuric salt and resin composition may, after grinding, be thinned with a volatile solvent.

The invention also includes a method of preventing the fouling of ships' and boats' hulls and other submerged surfaces by the application to such surfaces of the anti-fouling composition of the present invention, whether by spraying a hot solventless composition or by spraying, or applying by brush, a solvent-containing composition in accordance with this invention.

We have carried out many tests with organic mercuric compounds consisting in the immersion of metal plates in sea-water for a period of forty-three weeks. We have been able to evaluate the relative efficacy of a number of compounds and we find that the compounds can be listed in the following order of efficacy:

n-Propyl mercuric chloride
n-Butyl mercuric chloride
Phenyl mercuric chloride
Phenyl mercuric acetate
Tolyl mercuric chloride
n-Amyl mercuric chloride
Isobutyl mercuric chloride
Isopropyl mercuric chloride
Ethyl mercuric chloride
Isoamyl mercuric chloride The n-propyl and n-butyl mercuric chlorides are outstandingly superior to the other compounds listed in their power of preventing fouling of metal plates submerged in the sea.

The following examples, in which the quantities are given as parts by weight, will illustrate various compositions and their manner of manufacture in accordance with the present invention.

Example 1.—6 parts of zinc oxide, 3 parts of bauxite residue, 1 part of magnesium silicate and 3 parts of n-propyl mercuric chloride were ground into a vehicle on a cone mill, the amount of vehicle used being 7½ parts. The mixture of vehicle and the solid ingredients issuing from the cone mill was then diluted with 1½ parts of naphtha (25% by weight aliphatic hydrocarbons and having a specific gravity of 0.89) and driers were added thereto as follows: 0.0047 part of cobalt metal used in the form of cobalt naphthenate and 0.0084 part lead metal used as lead naphthenate.

The vehicle referred to above was prepared by heating together 10 parts of coumarone resin (melting point 80° to 85° C.) and 3 parts of China-wood oil; the mixture was heated to a temperature of 500° F. during a period of ½ hour, thereafter 1½ parts of litho oil (viscosity 3-10 poises after dilution with 50% by volume of white spirit and having an acid value of 25) was then added to the China-wood oil-resin mixture and the temperature was raised to 600° F. during a further period of ¾ hour whereafter the temperature was maintained at 600° F. for a further period of ½ hour.

The heating was then stopped and the mixture was cooled back by the addition of a further 1½ parts of the litho oil and, when cool, the mixture was thinned by the addition of 8 parts of naphtha (the specification of which is as above indicated).

Example 2.—60 parts of zinc oxide, 30 parts of bauxite residue, 10 parts magnesium silicate and 14 parts of n-butyl mercuric chloride were ground into 110 parts of vehicle as described in Example 1 and the ground mixture was thinned by the addition of 10.3 parts of thin sweet rosin oil having a specific gravity of 0.995.

The vehicle was prepared by mixing together 2.8 parts of rosin, American H grade gum (melting point 70° to 80° C. and acid value 170–190), and 1 part of coumarone resin (melting point 95° C.) was heated together sufficiently to melt them to a homogeneous mix whereafter the heating was stopped and the mixture was thinned with 3.4 parts of naphtha (high flash grade of specific gravity 0.86).

The invention also includes the coated submerged surfaces produced as a result of the operation of the present invention.

We claim:

1. An anti-fouling composition comprising a plasticized thermoplastic resinous material containing no substantial quantity of combined oil and capable of setting, independently of oxidation, to a film, tack-free at ordinarily temperatures, and from about 1% to about 30% by weight of at least one toxic substance of the group consisting of n-propyl and n-butyl mercuric halide, said at least one toxic substance being dispersed in said resinous material.

2. An anti-fouling composition as claimed in claim 1 wherein said at least one toxic substance is a chloride.

3. An anti-fouling composition as claimed in claim 1 wherein said toxic substance is n-propyl mercuric chloride.

4. An anti-fouling composition as claimed in claim 1 wherein said toxic substance is n-butyl mercuric chloride.

5. An anti-fouling composition as claimed in claim 1 wherein said resinous material is a natural resin.

6. An anti-fouling composition as claimed in claim 1 wherein said resinous material is a synthetic resin.

ARTHUR WILLIAM FRANK THYNNE.
ERNEST BOOTH,
R. H. BUCKLE.

Executors of the Estate of Donald Helmsley Hewitt, Deceased.

REFERENCES CITED

The following references are of record in the file of this patent:

UNITED STATES PATENTS

| Number | Name | Date |
|---|---|---|
| 2,044,772 | Conn | June 23, 1936 |
| 2,097,339 | Patterson et al. | Oct. 26, 1937 |
| 2,389,229 | Young et al. | Nov. 20, 1945 |

FOREIGN PATENTS

| Number | Country | Date |
|---|---|---|
| 578,312 | Great Britain | June 24, 1946 |

OTHER REFERENCES

Circular No. 259 of the Scientific Section of the Paint Manufacturer's Assoc. of U. S., Jan. 1926, pp. 240 & 268. (Copy in Div. 64.)